(12) United States Patent
Sugimoto et al.

(10) Patent No.: US 8,629,594 B2
(45) Date of Patent: Jan. 14, 2014

(54) LUBRICATION STRUCTURE OF GENERATOR MOTOR AND GENERATOR MOTOR

(75) Inventors: Yukihiko Sugimoto, Kamakura (JP); Teiichirou Chiba, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/698,107

(22) PCT Filed: Mar. 26, 2012

(86) PCT No.: PCT/JP2012/057804
§ 371 (c)(1),
(2), (4) Date: Nov. 15, 2012

(87) PCT Pub. No.: WO2012/133346
PCT Pub. Date: Oct. 4, 2012

(65) Prior Publication Data
US 2013/0057094 A1  Mar. 7, 2013

(30) Foreign Application Priority Data

Mar. 31, 2011 (JP) .................................. 2011-080709

(51) Int. Cl.
*H02K 5/16* (2006.01)
(52) U.S. Cl.
USPC ............................................. 310/90; 310/58
(58) Field of Classification Search
USPC .......... 310/52–58, 59, 90; 384/473–475, 476, 384/900
See application file for complete search history.

(56) References Cited

U.S. PATENT DOCUMENTS

| 7,594,757 | B2 | 9/2009 | Verhaegen |
| 2006/0239598 | A1* | 10/2006 | Matsuyama et al. .......... 384/462 |
| 2011/0001400 | A1 | 1/2011 | Chiba et al. |
| 2011/0012448 | A1* | 1/2011 | Tanaka ........................... 310/54 |

FOREIGN PATENT DOCUMENTS

| CN | 201629629 U | 11/2010 |
| JP | 61-72063 U | 5/1986 |
| JP | 61-169450 U | 10/1986 |
| JP | 11-008957 A | 1/1999 |
| JP | 2009-071905 A | 4/2009 |
| KR | 1020070030766 A | 3/2007 |

OTHER PUBLICATIONS

Chiba et al, English translation of JP 2009071905 A, Apr. 2009.*
International Search Report dated May 29, 2012, issued for PCT/JP2012/057804.

* cited by examiner

*Primary Examiner* — Thanh Lam
(74) *Attorney, Agent, or Firm* — Edwards Wildman Palmer LLP

(57) ABSTRACT

A lubrication structure of a generator motor, includes: at least two bearings rotatably supporting an input/output shaft of the generator motor; a gap provided between the two bearings; a cylindrical-shaped bearing attaching member attached to inner peripheral parts of the two bearings; and a through hole penetrating the bearing attaching member outward in a radial direction and opening in a position overlapping with the gap.

9 Claims, 10 Drawing Sheets

A-A

LUBRICATION STRUCTURE OF GENERATOR MOTOR AND GENERATOR MOTOR

FIELD

The present invention relates to lubrication of a bearing included in a generator motor.

BACKGROUND

A generator motor is used for various purposes, and generates heat due to Joule heating of a coil included in a stator, an overcurrent loss and a hysteresis loss of a rotor core, and the like. To cool the generator motor, a technology is, for example, disclosed wherein the generator motor is cooled by a coolant such as oil serving both as lubricant oil and cooling oil (Patent Literature 1).

CITATION LIST

Patent Literature

Patent Literature 1: Japanese Patent Application Laid-open No. 2009-071905

SUMMARY

Technical Problem

Dispersion of lubrication condition of a bearing may be caused due to dispersion of a flow rate of the coolant that passes through a coolant passage formed inside the generator motor when the bearing is lubricated using the coolant such as oil. Patent Literature 1 is silent about lack of lubrication of the bearing, and there is room for improvement. An object of the present invention is to reduce the dispersion of lubrication condition of the bearing when the bearing of the generator motor is lubricated.

Solution to Problem

To overcome achieve the object, according to the present invention, a lubrication structure of a generator motor, comprises: at least two bearings rotatably supporting an input/output shaft of the generator motor; a gap provided between the two bearings; a cylindrical-shaped bearing attaching member attached to inner peripheral parts of the two bearings; and a through hole penetrating the bearing attaching member outward in a radial direction and opening in a position overlapping with the gap.

According to the present invention, the lubrication structure of a generator motor further comprising a rotor core holding member attached to an outer peripheral part of the input/output shaft and to outer peripheral parts of the two bearings and holding a rotor core of the generator motor, wherein the rotor core holding member has an axial-direction through hole penetrating in a direction parallel with a rotation center axis of the input/output shaft.

According to the present invention, a spacer lies between the two bearings.

According to the present invention, the bearing attaching member has a first step part at an outer peripheral part, the first step part being in contact with one of the two bearings, and a rotor core holding member holding a rotor core of the generator motor has a second step part at an inner peripheral part, the second step part being in contact with the other of the two bearings.

According to the present invention, after the coolant passes through the through hole, flows into the gap, and passes through the two bearings, one part of the coolant is supplied to one coil end of a stator included in the generator motor, and the other part of the coolant is supplied to the other coil end of the stator after passing through the axial-direction through hole.

According to the present invention, a generator motor comprises the lubrication structure of a generator motor.

According to the present invention, in the generator motor, an output shaft of a power source is connected to one end of the input/output shaft, and an input shaft of a target to be driven by power of the power source is connected to the other end of the input/output shaft.

According to the present invention, a generator motor provided between an internal-combustion engine and a hydraulic pump, transferring power of the internal-combustion engine to the hydraulic pump, and generating electric power, comprises: at least two bearings rotatably supporting an input/output shaft of the generator motor; a gap provided between the two bearings; a cylindrical-shaped bearing attaching member disposed at an outer peripheral part of the input/output shaft and attached to inner peripheral parts of the two bearings; a through hole penetrating the bearing attaching member outward in a radial direction and opening in a position of the gap; a rotor core holding member attached to the outer peripheral part of the input/output shaft and to outer peripheral parts of the two bearings and holding a rotor core of the generator motor; an axial-direction through hole penetrating the rotor core holding member in a direction parallel with a rotation center axis of the input/output shaft; and a spacer lying between the two bearings.

The present invention is capable of reducing dispersion of lubrication condition of a bearing when the bearing of a generator motor is lubricated.

DESCRIPTION OF EMBODIMENTS

An embodiment that implements the present invention will be described in detail with reference to the drawings. The present invention is not limited by the contents described below in the embodiment. Also, the elements described below include elements that a person in the art easily conceives and elements that are substantially the same. Further, the elements described below can be properly combined. Furthermore, various omissions, displacements, modifications of the elements can be performed without departing from the scope of the present invention.

<Hybrid Excavator>

Figure 1:
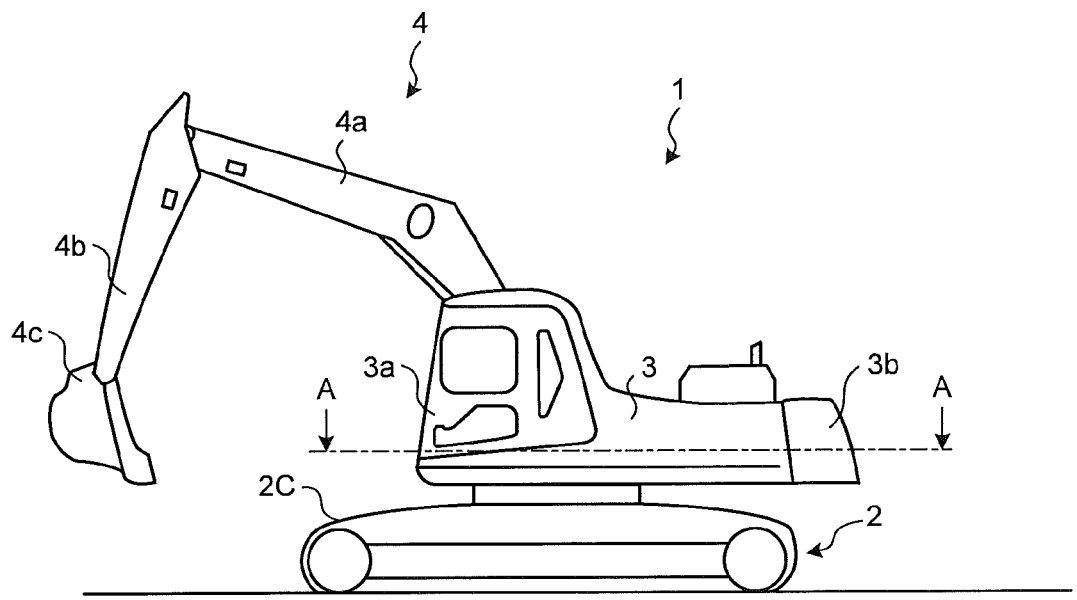
FIG. 1 is a side view illustrating a hybrid excavator using a generator motor according to a present embodiment.
Figure 2:
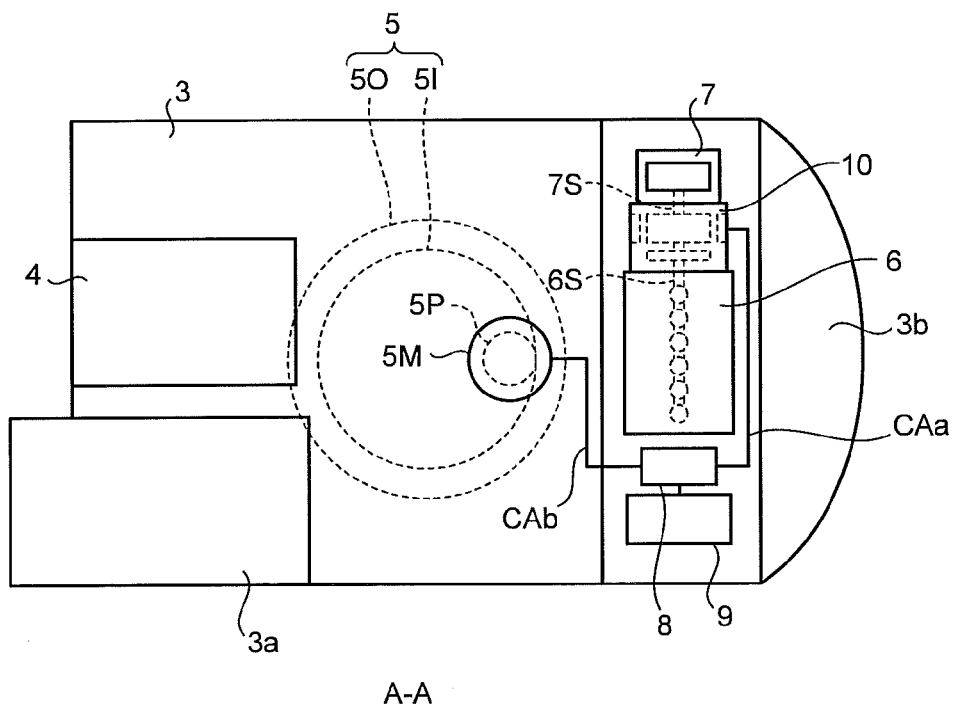
FIG. 2 is a diagram as viewed along the line A-A in FIG. 1.

FIG. 1 is a side view illustrating a hybrid excavator using a generator motor according to the present embodiment. FIG. 2 is a diagram as viewed along the line A-A in FIG. 1. A hybrid excavator 1 is a so-called hybrid-system construction vehicle that generates electric power by driving the generator motor by an internal-combustion engine, drives a motor by the electric power to cause an upper swinging body to swing, drives auxiliary machines of the hybrid excavator 1, and the like.

The hybrid excavator 1 includes a lower traveling body 2 having a pair of right and left crawlers 2C, an upper swinging body 3, a work machine 4 including a boom 4a, an arm 4b, and bucket 4c, and mounted on the upper swinging body 3, and a swing circle 5 coupling the lower traveling body 2 with the upper swinging body 3. The pair of right and left crawlers 2C is driven by a right-drive hydraulic motor and a left-drive hydraulic motor to cause the hybrid excavator 1 to drive. The right-drive hydraulic motor and the left-drive hydraulic motor are supplied and driven with hydraulic oil pumped from a hydraulic pump 7 illustrated in FIG. 2.

The upper swinging body 3 swings by a motor 5M (see FIG. 2) that functions as a swing motor. An outer race 50 of the swing circle 5 is fixed to the upper swinging body 3, and an inner race 51 of the swing circle 5 is fixed to the lower traveling body 2. With such a structure, the swing circle 5 couples the upper swinging body 3 with the lower traveling body 2. An input/output shaft of the motor 5M is coupled with a swing pinion 5P via swing machinery including a speed reducer. The swing pinion 5P meshes with an internal tooth attached to the inner race 51 of the swing circle 5. Driving force of the motor 5M is transmitted to the swing pinion 5P via the swing machinery to cause the upper swinging body 3 to swing. In the present embodiment, the motor 5M is disposed in such a way that the input/output shaft of the motor 5M faces in the direction of the action of gravity when the hybrid excavator 1 is disposed vertically, that is, disposed on a horizontal surface. The boom 4a, the arm 4b, and the bucket 4c are respectively driven by a boom 4a-hydraulic cylinder, an arm 4b-hydraulic cylinder, and a bucket 4c-hydraulic cylinder with hydraulic oil pumped from the hydraulic pump 7 illustrated in FIG. 2 via a control valve, and perform operation such as excavation.

The upper swinging body 3 has a structure having an approximately rectangular shape in a planar view. A cockpit 3a of the upper swinging body 3 is disposed in a front left side of the upper swinging body 3 where the direction of an operator's eye is a forward direction when the hybrid excavator 1 is in operation. A counterweight 3b is disposed in the backward of the upper swinging body 3. The upper swinging body 3 includes an internal-combustion engine 6 as a power source of the hybrid excavator 1, a generator motor 10 according to the present embodiment, the hydraulic pump 7, an inverter 8, and a storage device 9 in addition to the cockpit 3a and the counterweight 3b.

The internal-combustion engine 6 is, for example, a diesel engine, but may employ any type. The internal-combustion engine 6, the generator motor 10, the hydraulic pump 7, the inverter 8, and the storage device 9 are disposed in the forward of the counterweight 3b, that is, at a side of the cockpit 3a. The generator motor 10 is disposed between the internal-combustion engine 6 and the hydraulic pump 7. An output shaft 6S of the internal-combustion engine 6 is connected to the input/output shaft of the generator motor 10, and the input/output shaft of the generator motor 10 is connected to an input shaft 7S of the hydraulic pump 7. With such a structure, the internal-combustion engine 6 drives the generator motor 10 to generate the electric power, and drives the hydraulic pump 7. That is, the hydraulic pump 7 is driven via the generator motor 10. Note that the generator motor 10 may be indirectly connected to an output shaft of an engine via a PTO (power take off).

An input/output terminal of the inverter 8 and an electric power input/output terminal of the generator motor 10 are electrically connected by a high voltage wiring CAa. An output terminal of the inverter 8 and an input terminal of the motor 5M are electrically connected by a high voltage wiring CAb. The inverter 8 stores the electric power generated by the generator motor 10 in the storage device 9 such as a capacitor or a secondary battery, and supplies the electric power to the motor 5M to drive the motor 5M. Further, the inverter 8 stores, to the storage device 9, the electric power obtained in such a way that the motor 5M converts kinetic energy of the upper swinging body 3 into electric energy when a swing brake is applied to the upper swinging body 3. The electric power stored in the storage device 9 is supplied to the motor 5M by the inverter 8 when next the upper swinging body 3 swings. The generator motor 10 is operated as a motor by receiving the electric power from the storage device 9, and can supplement the internal-combustion engine 6, as needed.

As described above, the generator motor 10 according to the present embodiment is applied to the hybrid excavator 1 as a type of the construction vehicle. Note that application of the generator motor 10 is not limited to the hybrid excavator 1. For example, the generator motor 10 may be applicable to other hybrid construction machine such as a wheel loader.

<Generator Motor>

Figure 3:
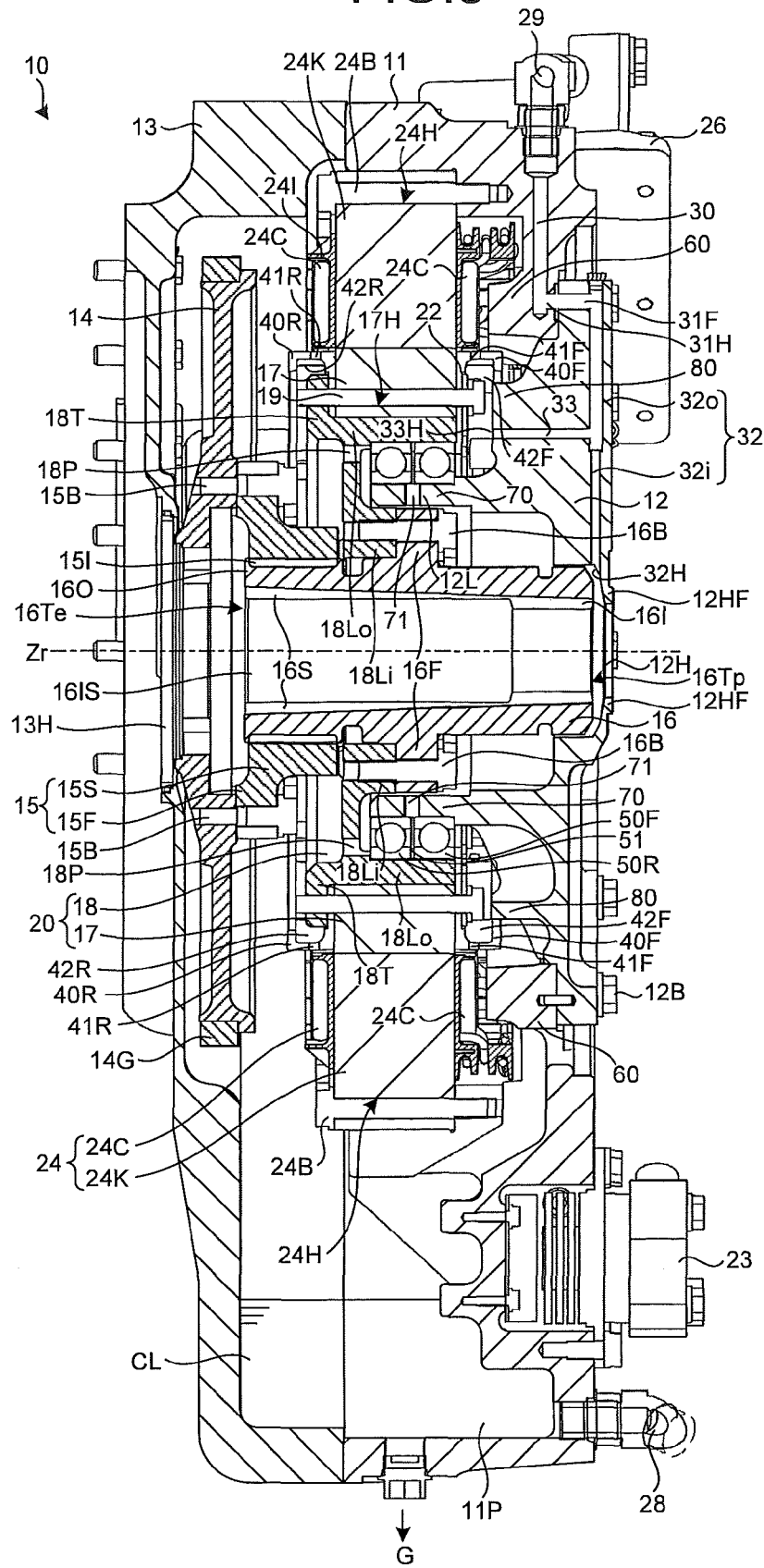
FIG. 3 is a cross-sectional view of the generator motor according to the present embodiment.
Figure 4:
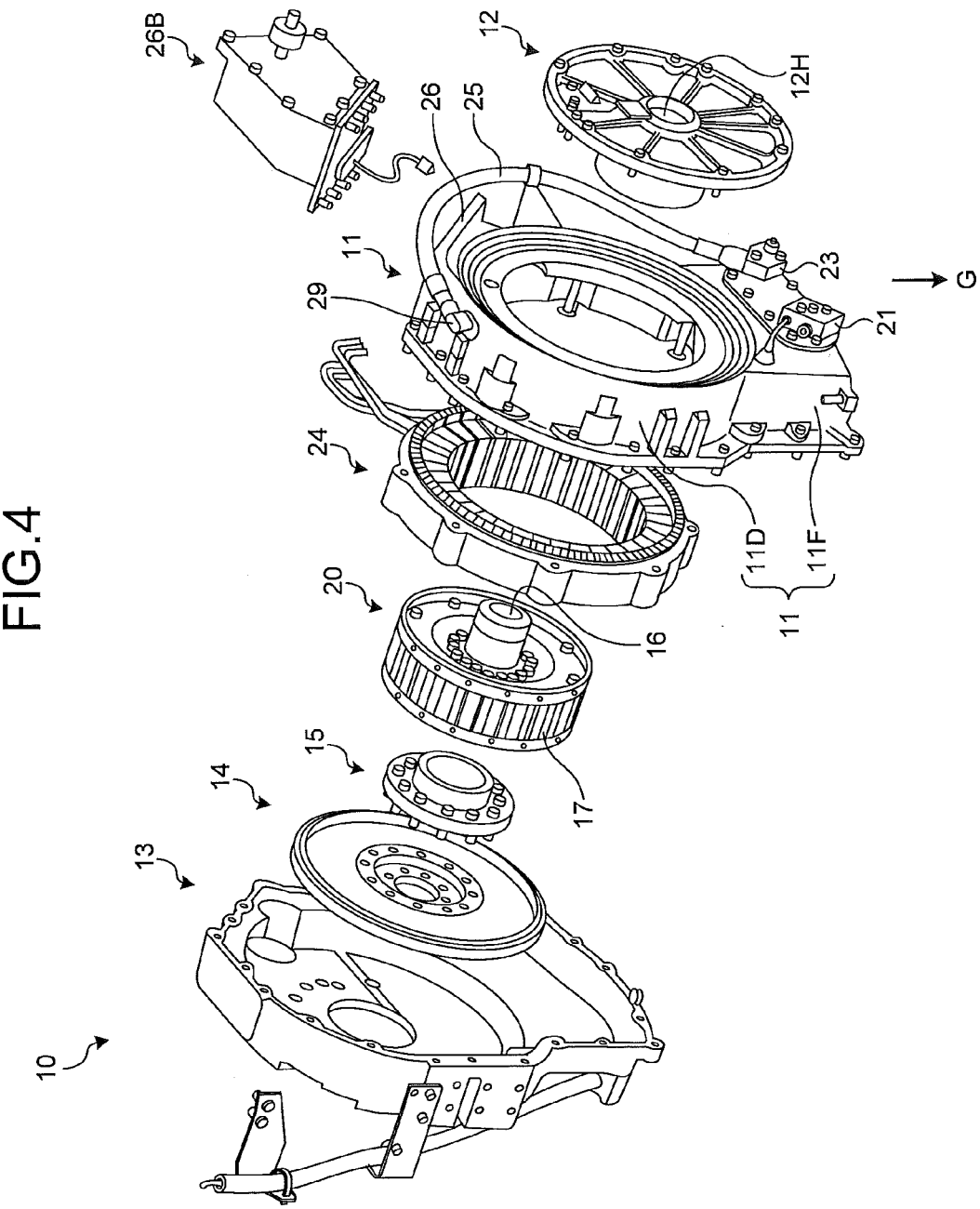
FIG. 4 is an exploded view of the generator motor according to the present embodiment.
Figure 5:
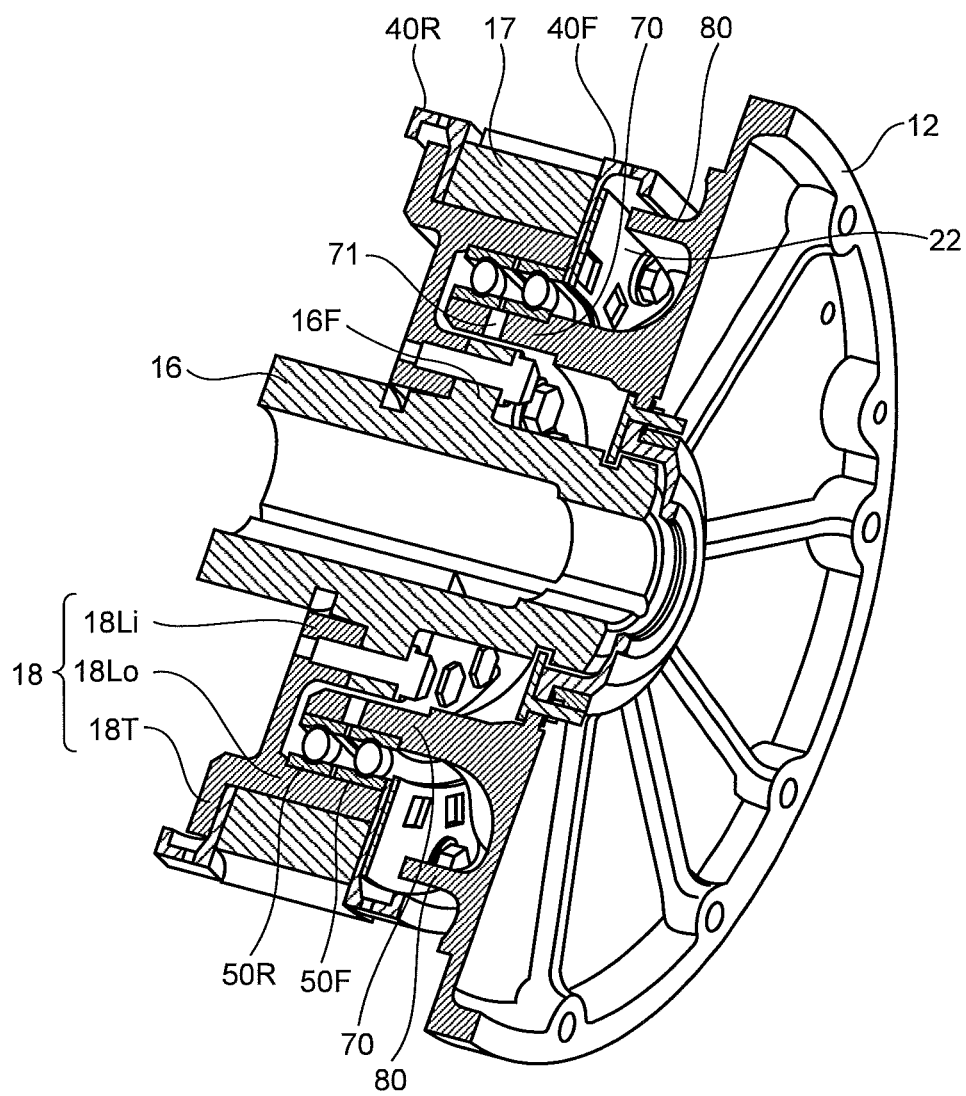
FIG. 5 is a perspective view illustrating a structure of an input/output shaft, a rotor, and a flange of the generator motor according to the present embodiment.
Figure 6:
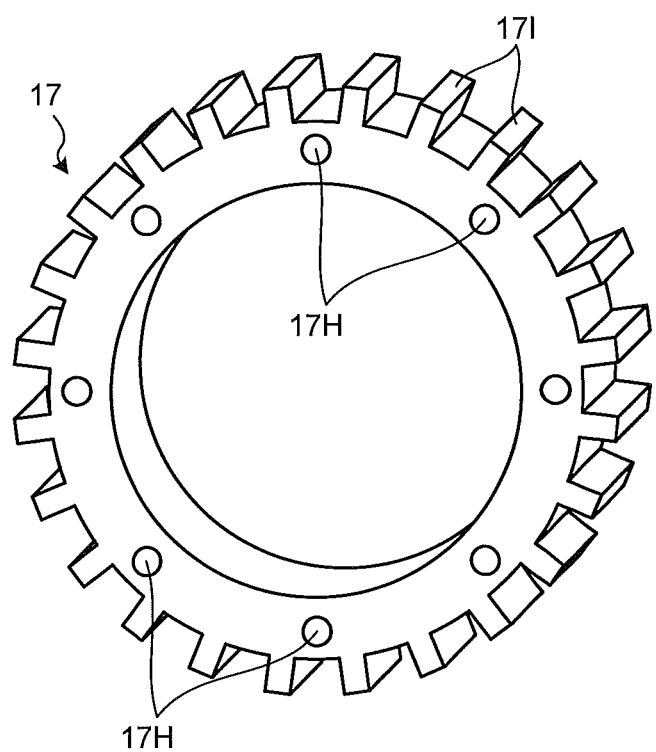
FIG. 6 is a perspective view of a rotor core included in the generator motor according to the present embodiment.
Figure 7:
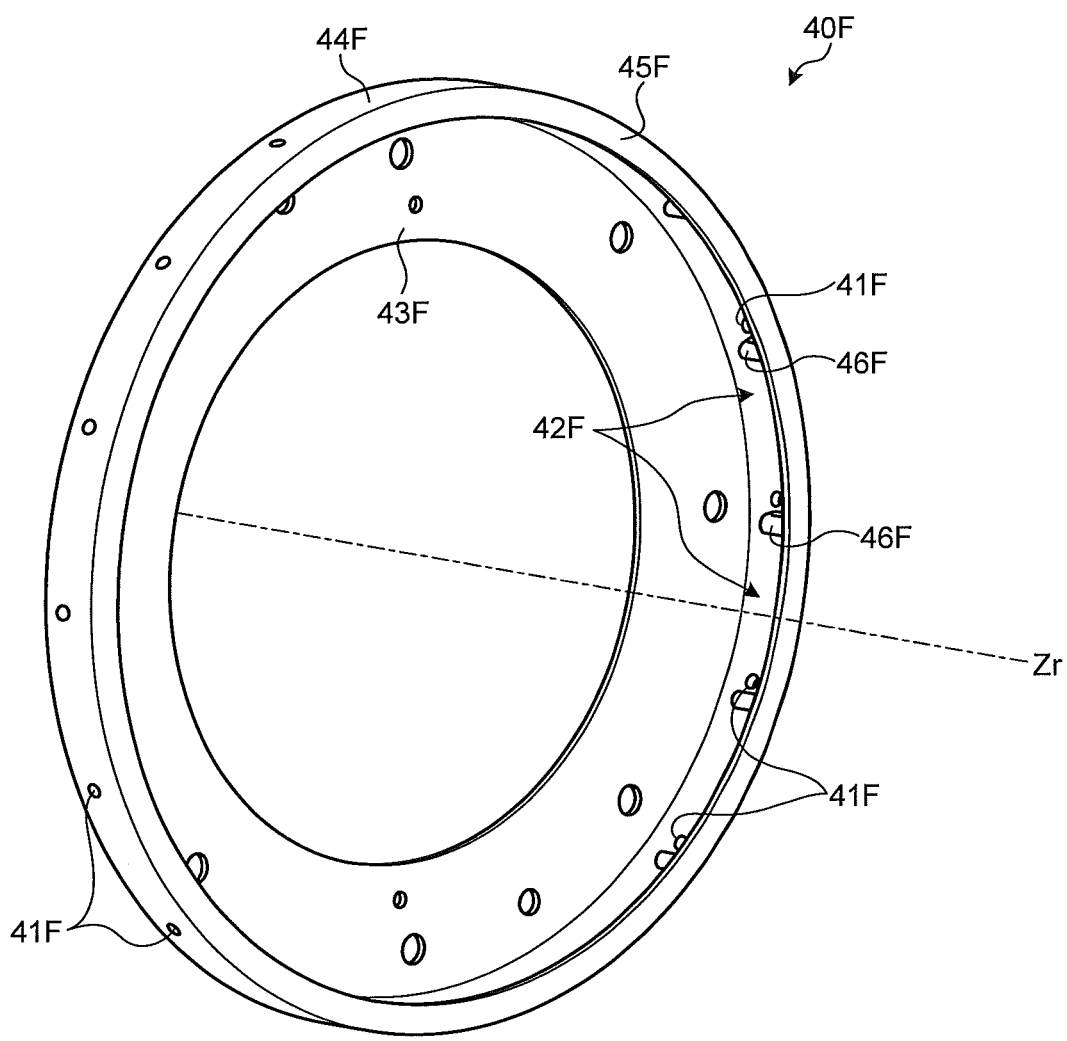
FIG. 7 is a perspective view illustrating a blade attached to the rotor core.
Figure 8:
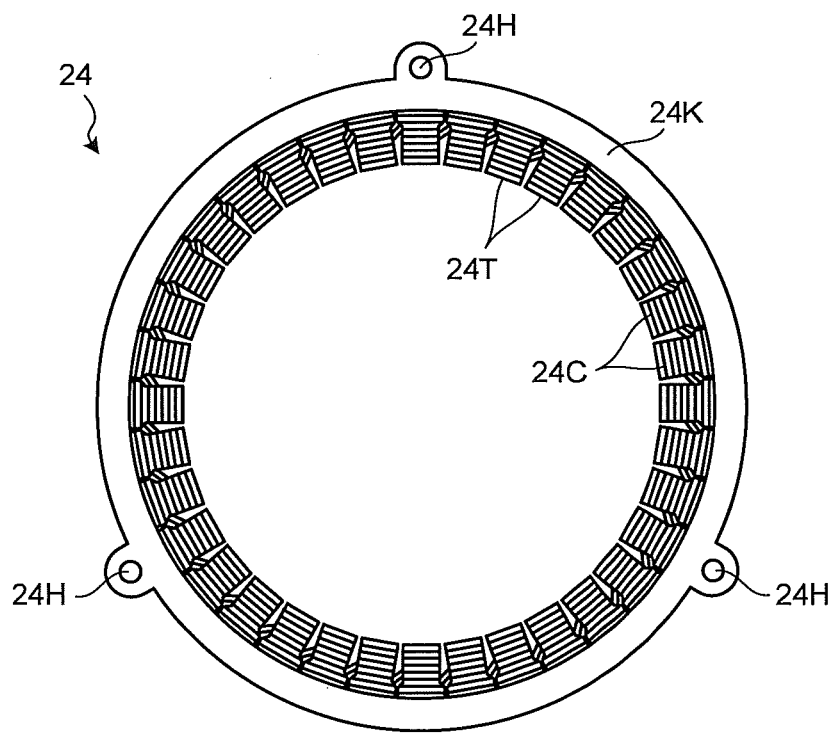
FIG. 8 is a front view of a stator included in the generator motor according to the present embodiment.
Figure 9:
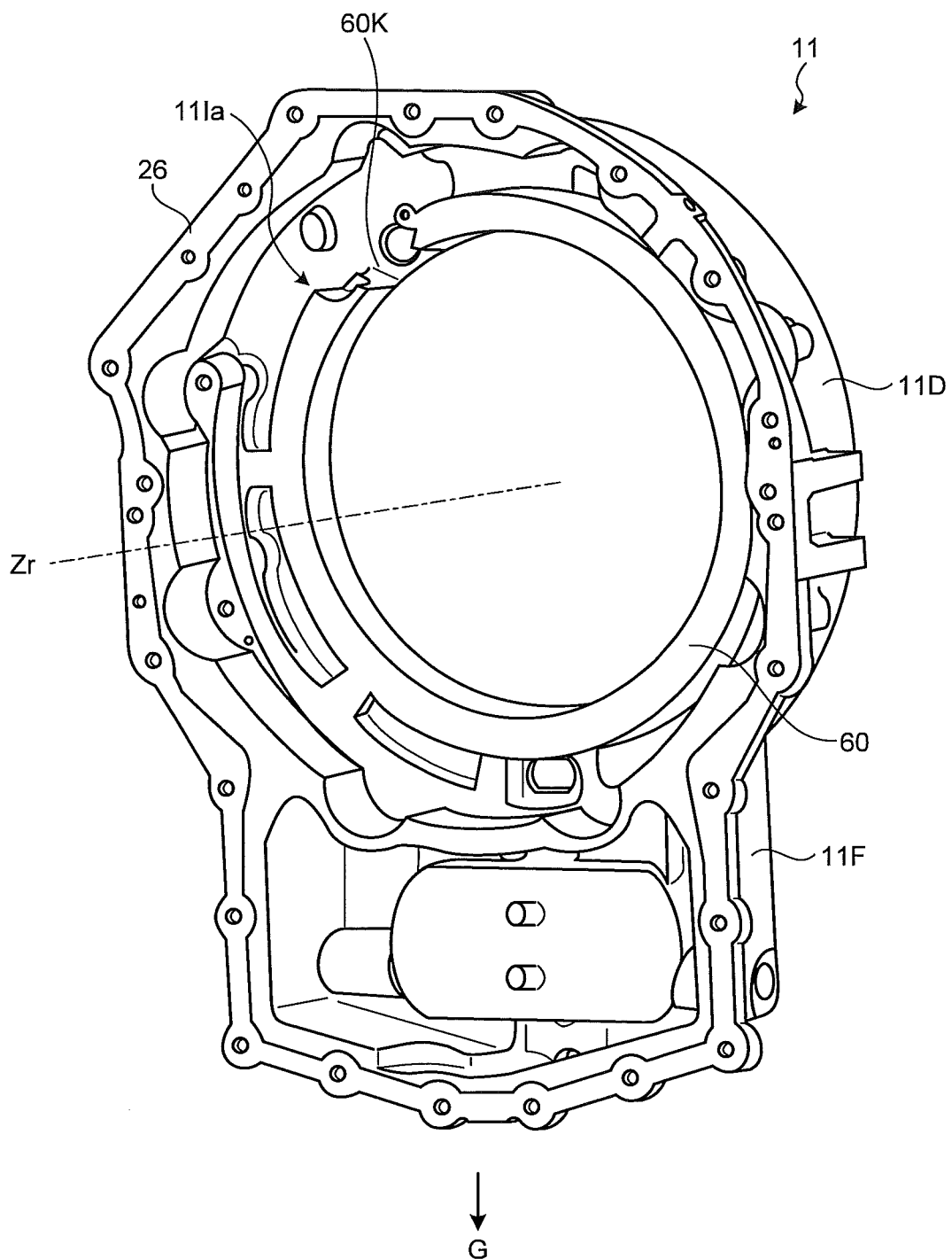
FIG. 9 is a perspective view of a first housing included in the generator motor according to the present embodiment.
Figure 10:
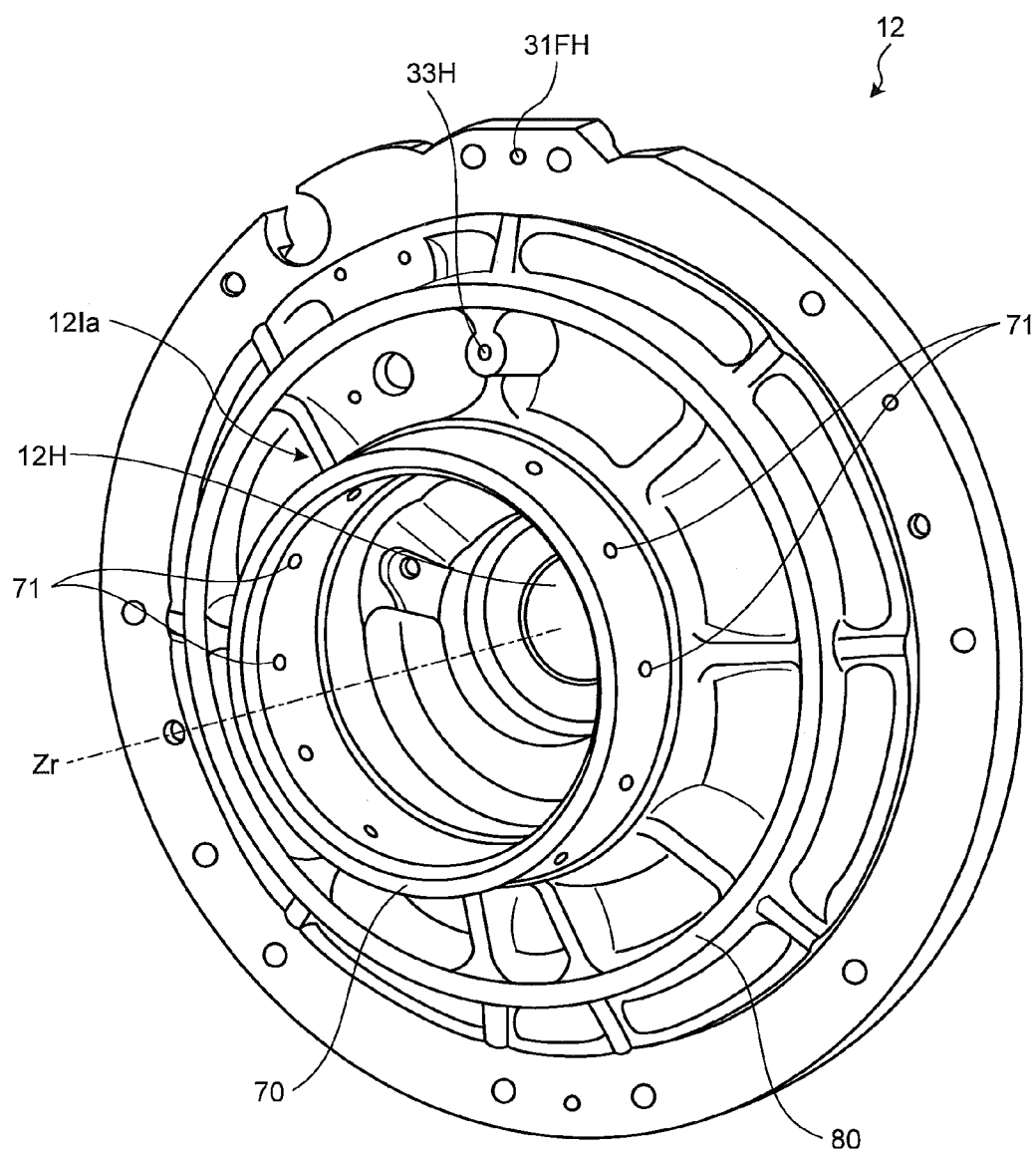
FIG. 10 is a perspective view of the flange included in the generator motor according to the present embodiment.

FIG. 3 is a cross-sectional view of the generator motor according to the present embodiment. FIG. 3 illustrates a cross section obtained by cutting the generator motor 10 with a plane including a rotation center axis Zr of the generator motor 10 and parallel with the rotation center axis Zr. FIG. 4 is an exploded view of the generator motor according to the present embodiment. FIG. 5 is a perspective view illustrating a structure of an input/output shaft, a rotor, and a flange of the generator motor according to the present embodiment. FIG. 6 is a perspective view of a rotor core included in the generator motor according to the present embodiment. FIG. 7 is a perspective view illustrating a blade attached to the rotor core. FIG. 8 is a front view of a stator included in the generator motor according to the present embodiment. FIG. 9 is a perspective view of a first housing included in the generator motor according to the present embodiment. FIG. 10 is a perspective view of the flange included in the generator motor according to the present embodiment.

As illustrated in FIG. 2, the generator motor 10 is disposed between the internal-combustion engine 6 and the hydraulic pump 7. The generator motor 10 generates the electric power by the power of the internal-combustion engine 6 and transfers the power of the internal-combustion engine 6 to the hydraulic pump 7. The generator motor 10 is, for example, cooled by a coolant such as oil, and the coolant lubricates a part (sliding part) that needs to be lubricated such as bearings 50F and 50R that rotatably support an input/output shaft 16, a spline, and the like.

As illustrated in FIGS. 3 and 4, the generator motor 10 includes a flywheel 14, a coupling member 15, the input/ output shaft 16, a rotor 20, a stator 24, a first housing 11 as a part of a case, a flange 12 as an end part side member (first end part side member) disposed at one end part of the case, that is, at one end part of the first housing 11, and a second housing 13 serving as a part of the case and disposed at the other end part of the first housing 11.

The flywheel 14 has a disk-shaped structure, and the output shaft 6S of the internal-combustion engine 6 illustrated in FIG. 2 is attached thereto. The flywheel 14 has a starter gear 14G at an outer peripheral part. The starter gear 14G is a ring gear with an outer tooth. The starter gear 14G has a function to transfer the power of a starter motor of the internal-combustion engine 6 to the output shaft 6S of the internal-combustion engine 6 to start up the internal-combustion engine 6. Note that the generator motor 10 may be worked as a motor to start up the internal-combustion engine 6.

<Flywheel>

The flywheel 14 is attached to the coupling member 15 with a plurality of bolts 15B. The flywheel 14 has a function to enhance the rotation efficiency of the internal-combustion engine 6 and to improve the power generation efficiency and the motor efficiency of the generator motor 10. The coupling member 15 has an approximately cylindrical-shaped main body part 15S and a circular-shaped flange part 15F extending outward in a radial direction of the main body part 15S from one end part side of the main body part 15S. The flange part 15F of the coupling member 15 and the flywheel 14 are fixed by fastening with the bolts 15B. The main body part 15S has an internal tooth spline 15I at an inner peripheral part.

<Input/Output Shaft>

The input/output shaft 16 has a cylindrical-shaped structure, one end part 16Tp is connected to the input shaft 7S of the hydraulic pump 7, and the other end part 16Te is connected to the output shaft 6S of the internal-combustion engine 6. The input/output shaft 16 has an internal tooth spline 16I at an inner peripheral part at a side of the one end part 16Tp, and an outer tooth spline 16O at an outer peripheral part at a side of the other end part 16Te. The internal tooth spline 16I meshes with an outer tooth spline included in the input shaft 7S of the hydraulic pump 7. The outer tooth spline 16O meshes with the internal tooth spline 15I included in the coupling member 15. With such a structure, the power of the internal-combustion engine 6 is transferred to the input/output shaft 16 via the flywheel 14 and the coupling member 15, and the power of the internal-combustion engine 6 transferred to the input/output shaft 16 is transferred to the input shaft 7S of the hydraulic pump 7 via the internal tooth spline 16I.

The input/output shaft 16 rotates around the rotation center axis Zr. The flywheel 14 and the coupling member 15 rotate around the rotation center axis Zr. The input/output shaft 16 has a circular-shaped flange part 16F extending outward in a radial direction from an outer peripheral part. The flange part 16F is a part to which the rotor 20 described below is attached. Also, the input/output shaft 16 has a shaft through hole 16IS penetrating from the one end part 16Tp to the other end part 16Te. The shaft through hole 16IS serves as a passage for the coolant that cools the generator motor 10. The input/output shaft 16 has ditches 16S formed along the one end part 16Tp to the other end part 16Te at two positions in an inner peripheral surface. The ditches 16S become larger from the one end part 16Tp to the other end part 16Te in depth. With such a structure, the coolant having flown from the one end part 16Tp side becomes easier to flow into the other end part 16Te, whereby the cooling efficiency is improved. In the present embodiment, although the flywheel 14 has been exemplarily described, the coupling member 15 and the output shaft 6S of the internal-combustion engine 6 may be connected with a spline or the like instead of using the flywheel 14.

<Rotor>

The rotor 20 includes a rotor core 17 and a rotor holder 18 as a rotor core holding member that holds the rotor core 17. The rotor core 17 has a structure in which a plurality of steel sheets (electrical steel) is layered. The direction into which the plurality of steel sheets is layered (layering direction) is parallel with the rotation center axis Zr under the condition that the rotor core 17 is attached to the input/output shaft 16. The rotor core 17 has a plurality of inductors 17I (24 in this example) projecting in a circumferential direction of an outer peripheral part at a predetermined pitch, as illustrated in FIG. 4. The rotor core 17 has a plurality of bolt holes 17H formed in a circumferential direction and penetrating in the layering direction. An inner peripheral surface of the rotor core 17 is in contact with an outer peripheral surface of the rotor holder 18.

The rotor holder 18 includes a first holder member 18Li, a second holder member 18Lo, and a third holder member 18T. The first holder member 18Li has a disk-shaped structure lacking a center part thereof. The second holder member 18Lo has a cylindrical-shaped structure provided at an outer peripheral part of the first holder member 18Li. The third holder member 18T has a disk-shaped structure lacking a center part thereof provided at one end part of the second holder member 18Lo, and extending outward in a radial direction of the input/output shaft 16. In the present embodiment, these members are integrally and inseparably manufactured with the same material. The material for the rotor holder 18 is but not limited to, steel, for example. The rotor holder 18 is fastened to the flange part 16F of the input/output shaft 16 with a bolt 16B. The rotor holder 18 rotates around the rotation center axis Zr with the input/output shaft 16. Note that the first holder member 18Li has an axial-direction through hole 18P parallel with an axial direction (direction parallel with the rotation center axis Zr) of the rotor holder 18. The axial-direction through hole 18P serves as a passage for the coolant.

The rotor core 17 is attached to an outer peripheral part of the second holder member 18Lo. At this time, a rotor core attaching bolt 19 is inserted into the bolt holes 17H of the rotor core 17, and is screwed into a screw hole of the third holder member 18T, so that the rotor core 17 is fixed to the rotor holder 18. In the present embodiment, the rotor core 17 is attached to the rotor holder 18 with a first blade 40F and a second blade 40R under the condition that the rotor core 17 is sandwiched by the first blade 40F and the second blade 40R from both sides in the layering direction of the rotor core 17. Note that the first blade 40F is disposed at a side of the flange 12, and the second blade 40R is disposed at a side of the second housing 13. Further, a sensor plate 22 used for detecting a rotation speed of the input/output shaft 16 is disposed at a side closer to a bolt head of the rotor core attaching bolt 19 than the first blade 40F, and is attached to the rotor holder 18 with the rotor core attaching bolt 19. The sensor plate 22 is made of a ring-shaped plate, and has, as illustrated in FIG. 5, a plurality of holes in a circumferential direction. The rotation speed of the input/output shaft 16 is detected by counting the plurality of holes by an optical sensor, a magnetic sensor, or the like via the rotor holder 18.

As illustrated in FIG. 7, the first blade 40F and the second blade 40R are made of a ring-shaped member. The first blade 40F and the second blade 40R has a function of holding the rotor core 17 that has the plurality of steel sheets and a function of suppressing leakage of a magnetic flux generated by the stator 24 and entering the rotor core 17. Although FIG. 7 illustrates the first blade 40F only, the second blade 40R has the same shape and size except for the disposition of coolant outflow holes 41F and 41R and the inner diameter of an opening of the center. Therefore, as for the description of the first blade 40F and the second blade 40R, only the first blade 40F is described as needed. Note that the first blade 40F disposed at the side of the flange 12 has the opening with a smaller diameter than that of the second blade 40R in order to fix the first bearing 50F and the second bearing 50R.

The first blade 40F has a first part 43F, a second part 44F, and a third part 45F. The first part 43F is a disk-shaped part lacking a center part thereof, and allows the first blade 40F to be in contact with one end part of the rotor core 17. The second part 44F is a cylindrical-shaped part, provided at an outer peripheral part of the first part 43F, and extending toward a side opposite to a side in contact with the rotor core 17. A plurality of protrusions 46F is provided at an inner peripheral part of the second part 44F in a circumferential direction. The protrusion 46F protrudes inward in a radial direction from the inner peripheral part of the second part 44F. In the present embodiment, each of the protrusions 46F is displaced in a circumferential direction of the second part 44F at approximately even intervals. The third part 45F is a flange-like and disk-shaped part lacking a center part thereof, provided at an end part opposite to an end part of the first part 43F of the second part 44F, and extending toward the rotation center axis Zr. The inner diameter of the third part 45F is larger than that of the first part 43F.

The first part 43F, the second part 44F, and the third part 45F are integrally and inseparably manufactured with the same material. In the present embodiment, the first blade 40F is, for example, manufactured with casting an aluminum alloy. Note that the first blade 40F may be manufactured in such a way that the first part 43F, the second part 44F, and the third part 45F are respectively manufactured as separate parts, and the parts are integrated by means of welding or fastening with a bolt.

As illustrated in FIG. 3, the first blade 40F and the second blade 40R have, at outer peripheral parts, coolant holding parts 42F and 42R that hold the coolant. The coolant holding part 42F is a part surrounded by the first part 43F, the second part 44F, the third part 45F, and two adjacent protrusions 46F (same applies to the second blade 40R). Note that the coolant holding parts 42F and 42R do not necessarily include the protrusions 46F. Further, the first blade 40F and the second blade 40R have, at outer peripheral parts, the coolant outflow holes 41F and 41R penetrating outward in a radial direction. A plurality of the coolant outflow holes 41F and 41R is provided in circumferential directions of the first blade 40F and the second blade 40R. The coolant held by the coolant holding parts 42F and 42R flows from the coolant outflow holes 41F and 41R by centrifugal force caused by rotation of the rotor 20, and is discharged outward in radial directions of the first blade 40F and the second blade 40R. The coolant outflow holes 41F and 41R favorably open toward coil ends, and are more favorably provided in positions facing the coil ends. In doing so, the coolant can be concentrated into the coil ends when the coolant is discharged, whereby the coil ends can be more efficiently cooled.

The flywheel 14, the coupling member 15, the input/output shaft 16, the rotor holder 18, the rotor core 17, the first blade 40F, the second blade 40R, the sensor plate 22, the bolts 16B and 19 fastening these parts, and the like serve as rotating components of the generator motor 10. Next, the stator 24 will be described.

<Stator>

The stator 24 includes a stator core 24K and a coil 24C. The coil 24C winds around the stator core 24K via an insulator 24I attached to the stator core 24K. The stator core 24K has a ring-shaped structure in which a plurality of ring-shaped steel sheets (electrical steel) is layered. In an inner peripheral part of the stator core 24K, a plurality of protrusions 24T protrudes toward the center in a circumferential direction of the stator core 24K at a predetermined pitch. The protrusions 24T are a part of the stator core 24K. Each of the protrusions 24T serves as a magnetic pole of the generator motor 10. Three coils as the coils 24C wind around each peripheral surface of the protrusions 24T via the insulator 24I in turn. Parts sticking out from both end parts of the stator core 24K in the layering direction of the ring-shaped steel sheets are coil ends of the coil 24C.

The insulator 24I is made of a resin member and lies between the coil 24C and the stator core 24K. The insulator 24I has notches at parts that overlap with the coil ends of the coil 24C. The coolant discharged from the rotating rotor 20 reaches the coil ends through the notches. In this way, the notches of the insulator 24I allows the coolant from the rotating rotor 20 to be directly supplied to the coil ends, whereby the coil ends can be efficiently cooled.

In the present embodiment, the stator core 24K has a total of 36 protrusions 24T. Such a structure constitutes a 3-phase 12-pole SR (switched reluctance) motor. Note that the present embodiment is not limited to the above structure, and for example, other type generator motor such as a PM (permanent magnet) motor may be employed. Six coil terminals at both end parts of the three coils 24C are electrically connected to a terminal connection part provided at a connector box 26B (see FIG. 4) attached to a connector box pedestal 26 included in the first housing 11. The six coil terminals are electrically connected to the high voltage wiring CAa illustrated in FIG. 2 via the terminal connection part.

Bolt holes 24H are provided in a plurality of protrusion parts (three in the present embodiment) at an outer peripheral part of the stator core 24K. Each of the protrusion parts is fitted into a recess part formed in an inner peripheral part of the first housing 11. The stator core 24K can be positioned with respect to the first housing 11 by fitting each of the protrusion parts into the recess part. The positioned stator core 24K is attached to the first housing 11 by causing a bolt 24B to penetrate into the bolt hole 24H.

The generator motor 10 has the rotor 20 disposed inside the stator 24. To be more specific, the rotor core 17 is disposed inside the stator core 24K. With such a disposition, the inductors 17I included in the rotor core 17 and the protrusions 24T included in the stator core 24K face each other at predetermined intervals. As described above, the protrusions 24T provided at the inner peripheral part of the stator core 24K at even intervals and constituting a magnetic pole are a total of 36. On the other hand, the inductors 17I provided at an outer peripheral part of the rotor core 17 at even intervals are a total of 24. In this way, the generator motor 10 provides a pitch difference between the number of magnetic poles (protrusions 24T) in the stator core 24K, that is, a pitch between the magnetic poles (the protrusions 24T), and a pitch between the inductors 17I in the rotor core 17. Next, the first housing 11, the flange 12, and the second housing 13 of the generator motor 10 will be described.

<First Housing>

As illustrated in FIGS. 4 and 9, the first housing 11 has a structure including an approximately cylindrical-shaped part (cylindrical part) 11D and an overhung part 11F overhanging outward in a radial direction of the cylindrical part 11D from the cylindrical part 11D, and has openings at both end parts. The flange 12 is attached to one end part and the second housing 13 is attached to the other end part of the first housing 11. The first housing 11 has the rotor 20 and the stator 24 disposed on an outer peripheral part of the rotor 20 in its inside. To be more specific, the rotor 20 and the stator 24 are disposed in a space surrounded by the first housing 11, the flange 12, and the second housing 13. As illustrated in FIG. 3, a part of the overhung part 11F serves as an oil pan 11P as a coolant reservoir for collecting a coolant CL. A discharge passage 28 that connects the oil pan 11P with outside is provided at the overhung part 11F of the first housing 11. Also, the coolant in the oil pan 11P can be discharged from a drain.

The first housing 11 has a protrusion part 60 protruding toward the stator 24 from one end part, that is, from an inner surface 11Ia at a side where the flange 12 is attached to (inner surface at a flange side). The protrusion part 60 is provided more outward in a radial direction than the first blade 40F attached to the rotor holder 18, and faces the coil 24C of the stator 24. The protrusion part 60 is provided along the stator 24. That is, the protrusion part 60 is provided on a concentric circle around the rotation center axis Zr. The protrusion part 60 has a partial notch part 60K in a position of the connector box pedestal 26. A lead of the coil 24C illustrated in FIG. 3 is led out from the notch part 60K. A top face of the protrusion part 60, that is, a surface facing the coil 24C is a plane surface. A portion between the protrusion part 60 and the coil 24C serves as a passage through which the coolant passes. The top face of the protrusion part 60 is disposed at a position closer to the rotor core 17 than the third part 45F of the first blade 40F (see FIG. 7), that is, provided at a side of the coil 24C. In doing so, the coolant discharged from the coolant outflow hole 41F of the first blade 40F can be led to the coil end of the coil 24C. As a result, the coil end can be more efficiently cooled.

The first housing 11 has a coolant supply port 29 attached to a top part. The generator motor 10 is supposed to be used by disposing the overhung part 11F in the vertical direction (in the direction of the action of gravity, the direction illustrated by the arrow G in FIGS. 3 and 4). The top part of the first housing 11 is the highest part from a disposition surface when the overhung part 11F of the generator motor 10 is disposed in the vertical direction. The first housing 11 has a coolant introduction passage 30 extending toward the rotation center axis Zr of the input/output shaft 16 from the coolant supply port 29. Further, the first housing 11 has a connecting passage 31H opening and extending toward the side of the flange 12 in the vicinity of a termination of the coolant introduction passage 30. The connecting passage 31H of the first housing 11 is connected to a connecting passage 31F included in the flange 12.

A piping 25 as a coolant returning passage is connected to the coolant supply port 29. The coolant supplied from the coolant supply port 29 is collected to the oil pan 11P after cooling each part of the generator motor 10. This coolant is transferred from the discharge passage 28 to an oil cooler inlet 21 illustrated in FIG. 4 via a filter and a pipe (not illustrated), is cooled in the oil cooler inlet 21, and is then supplied from an oil cooler outlet 23 to the coolant supply port 29 again through the piping 25. In this way, the coolant circulates inside the generator motor 10.

<Flange>

The flange 12 is attached to an opening at one end part of the first housing 11 with a plurality of bolts 12B. The flange 12 is disposed at a side of the hydraulic pump 7 illustrated in FIG. 2. Further, the flange 12 has a through hole 12H for attaching the input shaft 7S of the hydraulic pump 7 to the input/output shaft 16 of the generator motor 10 at a side opposite to a side attached to the first housing 11. The input shaft 7S of the hydraulic pump 7 is attached to the input/output shaft 16 through the through hole 12H.

The flange 12 has a bearing attaching member 70 extending until an outer periphery of the flange part 16F included in the input/output shaft 16 in a radial direction. The bearing attaching member 70 is made of a cylindrical-shaped member and is integrally formed with the flange 12 in the present embodiment. Note that the flange 12 and the bearing attaching member 70 may be prepared as separate parts and be integrated with a fastening means such as a bolt or by a connecting means such as welding. The bearing attaching member 70 protrudes from a surface of the flange 12 and at a side of a case of the generator motor 10 illustrated in FIG. 3, that is, from a surface 12Ia at a side of the first housing 11 (inner surface at a side of the case). The bearing attaching member 70 is disposed between the first holder member 18Li of the rotor holder 18 and the flange part 16F of the input/output shaft 16, and the second holder member 18Lo of the rotor holder 18.

The through hole 12H of the flange 12 has an overhung part 12HF extending inward in a radial direction until a position in the middle of the internal tooth spline 16I included in the input/output shaft 16. An inner peripheral part of the overhung part 12HF extends until a position in the middle of the internal tooth spline 16I. The overhung part 12HF leads the coolant flowing from an inner first passage 32i to a side of the input/output shaft 16, and suppresses that the coolant flows into a side of the hydraulic pump 7 through the through hole 12H to the minimum. In doing so, the coolant flowing outside from the inside of the generator motor 10 through the through hole 12H can be suppressed to the minimum, and the coolant can be led to the inside of the generator motor 10.

As illustrated in FIGS. 3 and 5, the first bearing 50F and the second bearing 50R are attached to an outer peripheral part of the bearing attaching member 70 by interposing a ring-shaped and plate-like spacer 51 inbetween. The spacer 51 is disposed at a side of outer rings of the first bearing 50F and the second bearing 50R. In the present embodiment, the first bearing 50F and the second bearing 50R are, but not limited to, a deep groove ball bearing. The first bearing 50F is disposed at the side of the flange 12, and the second bearing 50R is disposed at the side of the second housing 13. In the present embodiment, inner rings of the first bearing 50F and the second bearing 50R are attached to the bearing attaching member 70. The bearing attaching member 70 is disposed at a side of an outer peripheral part of the input/output shaft 16. The outer rings of the first bearing 50F and the second bearing 50R are attached to an inner peripheral part of the second holder member 18Lo of the rotor holder 18. With such a structure, the first bearing 50F and the second bearing 50R lie between the bearing attaching member 70 and the rotor holder 18. Further, the bearing attaching member 70 rotatably supports the rotor holder 18, the input/output shaft 16, the coupling member 15, and the flywheel 14 via the first bearing 50F and the second bearing 50R.

Since the spacer 51 lies between the first bearing 50F and the second bearing 50R and at a side of the outer rings thereof, a gap having the thickness of the spacer 51 exists between the first bearing 50F and the second bearing 50R. The bearing attaching member 70 has a through hole 71 opening in a position of the gap. The through hole 71 serves as a passage for the coolant and supplies the coolant to the first bearing 50F and the second bearing 50R via the gap.

The flange 12 has a rib 80 protruding toward the first blade 40F at a position more inward in a radial direction than the first blade 40F attached to the rotor holder 18 and at the position outside the bearing attaching member 70 in a radial direction. The rib 80 is made of a cylindrical-shaped member formed on a concentric circle around the rotation center axis Zr, and is integrally formed with the flange 12 in the present embodiment. Note that the flange 12 and the rib 80 may be prepared as separate parts, and be integrated with a fastening means such as a bolt or by a connecting means such as welding.

The rib 80 faces the rotor 20. A top face of the rib 80, that is, a surface facing the rotor 20 is a plane surface. A portion between the rib 80 and the rotor 20 serves as a passage through which the coolant passes. The top face of the rib 80 partially overlaps with the first blade 40F in the direction parallel with the rotation center axis Zr of the input/output shaft 16. That is, the top face of the rib 80 is positioned at a side closer to the rotor 20 (a side of the coolant holding part 42F) than an end face of the first blade 40F at the side of the flange 12. In doing so, the coolant can be more surely introduced inside the coolant holding part 42F of the first blade 40F.

The flange 12 has the connecting passage 31F connected to the connecting passage 31H of the first housing 11, a first passage 32 connected to the connecting passage 31F, and a second passage 33 diverging from the first passage 32. As illustrated in FIG. 10, the connecting passage 31F opens in a part of an outer peripheral part of the flange 12. This opening serves as an inlet 31FH of the connecting passage 31F. The first passage 32 has an outside first passage 32o and the inner first passage 32i connected to the outside first passage 32o and having a smaller inner diameter than the outside first passage 32o. Note that the inner first passage 32i is disposed at a side closer to the input/output shaft 16 than the outside first passage 32o. The inner first passage 32i of the first passage 32 opens in a part at a side of the input/output shaft 16 of the flange 12, that is, in a part where a part of the input/output shaft 16 and the flange 12 overlap in the direction of the rotation center axis Zr. The opening at the side of the input/output shaft 16 of the inner first passage 32i serves as a first passage outlet 32H.

The second passage 33 diverges from the outside first passage 32o. That is, the second passage 33 diverges before the inner diameter of the first passage 32 becomes smaller. Further, the second passage 33 extends toward the rotor 20 attached to an outside of the input/output shaft 16, and opens at a side of the rotor 20 of the flange 12. A part diverges from the first passage 32 serves as a second passage inlet 33I, and the opening at the side of the rotor 20 of the second passage 33 serves as a second passage outlet 33H (see FIGS. 3 and 10).

<Second Housing>

The second housing 13 is attached to an opening of the other end part of the first housing 11. The second housing 13 is disposed at a side of the internal-combustion engine 6 illustrated in FIG. 2. Further, the second housing 13 has a through hole 13H for attaching the output shaft 6S of the internal-combustion engine 6 to the input/output shaft 16 of the generator motor 10 at a side opposite to a side to which the first housing 11 is attached. The output shaft 6S of the internal-combustion engine 6 is attached to the flywheel 14 through the through hole 13H. Next, a pass of the coolant inside the generator motor 10 will be described.

<Coolant Pass>

The coolant having flown from the coolant supply port 29 passes through the coolant introduction passage 30 and the connecting passages 31H and 31F, and flows into the first passage 32. A part of the coolant having flown into the first passage 32 diverges to the second passage 33, and the rest of the coolant flows into the inner first passage 32i, and flows out from the first passage outlet 32H. A part of the coolant having flown from the first passage outlet 32H flows into the shaft through hole 16IS from between the internal tooth spline 16I of the input/output shaft 16 and the outer tooth spline of the input shaft 7S of the hydraulic pump 7 illustrated in FIG. 2. The rest of the coolant passes through a space between the input/output shaft 16 and the flange 12 and between the input/output shaft 16 and the bearing attaching member 70, and flows into a gap between the first bearing 50F and the second bearing 50R through the through hole 71 of the bearing attaching member 70.

The first passage outlet 32H favorably opens in a position of the one end part 16Tp of the input/output shaft 16. That is, the first passage outlet 32H favorably opens in a position of a connection part of the input/output shaft 16 and the input shaft 7S of the hydraulic pump 7 as a target to be driven of the internal-combustion engine 6. In doing so, the coolant can be supplied between the input/output shaft 16 and the input shaft 7S of the hydraulic pump 7, more specifically, between the internal tooth spline 16I of the input/output shaft 16 and the outer tooth spline of the input shaft 7S of the hydraulic pump 7 illustrated in FIG. 2. As a result, the coolant can be efficiently introduced inside the shaft through hole 16IS. Further, as described above, the overhung part 12HF included in the through hole 12H of the flange 12 controls the coolant flowing out from the first passage outlet 32H not to flow into a side of the hydraulic pump 7. Therefore, the coolant can be efficiently introduced into the shaft through hole 16IS.

The coolant having flown into the gap between the first bearing 50F and the second bearing 50R cools and lubricates the first bearing 50F and the second bearing 50R, and then, a part of the coolant flows into between the bearing attaching member 70 and the rib 80. The rest of the coolant passes through the axial-direction through hole 18P included in the first holder member 18Li of the rotor holder 18. The coolant having flown between the bearing attaching member 70 and the rib 80 flows into the coolant holding part 42F of the first blade 40F, and then, flows out from the coolant outflow hole 41F of the coolant holding part 42F. The coolant is discharged outward in a radial direction of the rotor 20 by centrifugal force caused by rotation of the rotor 20, and is spread over the coil end of the coil 24C and cools the coil end. The coolant having cooled the coil end is collected to the oil pan 11P.

The coolant CL having passed through the axial-direction through hole 18P included in the first holder member 18Li flows along the third holder member 18T of the rotor holder 18, flows into the coolant holding part 42R of the second blade 40R, and flows out from the coolant outflow hole 41R of the coolant holding part 42R. The coolant CL is discharged outward in a radial direction of the rotor 20 by the centrifugal force caused by the rotation of the rotor 20, and is spread over the coil end of the coil 24C and cools the coil end. The coolant having cooled the coil end is collected to the oil pan 11P.

The coolant having flown into the shaft through hole 16IS flows toward the other end part 16Te from the one end part 16Tp of the input/output shaft 16, and flows out from the other end part 16Te. The coolant passes between the outer tooth spline 16o of the input/output shaft 16 and the internal tooth spline 151 of the coupling member 15, and flows out between the coupling member 15 and the rotor holder 18. The coolant flows outward in a radial direction along the first holder member 18Li and the third holder member 18T of the rotor holder 18, then flows into the coolant holding part 42R of the second blade 40R, and flows out from the coolant outflow hole 41R of the coolant holding part 42R. The coolant is discharged outward in a radial direction of the rotor 20 by the centrifugal force caused by the rotation of the rotor 20, and is spread over the coil end of the coil 24C and cools the coil end. The coolant having cooled the coil end is collected in the oil pan 11P.

The coolant having passed through the second passage 33 flows out from the second passage outlet 33H, and flows toward the rotor 20. The coolant having reached the rotor 20 is discharged outward in a radial direction of the rotor 20 by the centrifugal force caused by the rotation of the rotor 20, and is spread over the coil end of the coil 24C at the side of the flange 12 and cools the coil end. The coolant having cooled the coil end flows downward by the action of gravity and is collected to the oil pan 11P. The coolant collected in the oil pan 11P is transferred to the oil cooler inlet 21 illustrated in FIG. 4 through a filter and a pump (not illustrated) from the discharge passage 28, is cooled in the oil cooler inlet 21, then passes through the piping 25 from the oil cooler outlet 23, and is supplied from the coolant supply port 29 again. Next, a lubrication structure of a generator motor according to the present embodiment will be described in detail.

Figure 11:
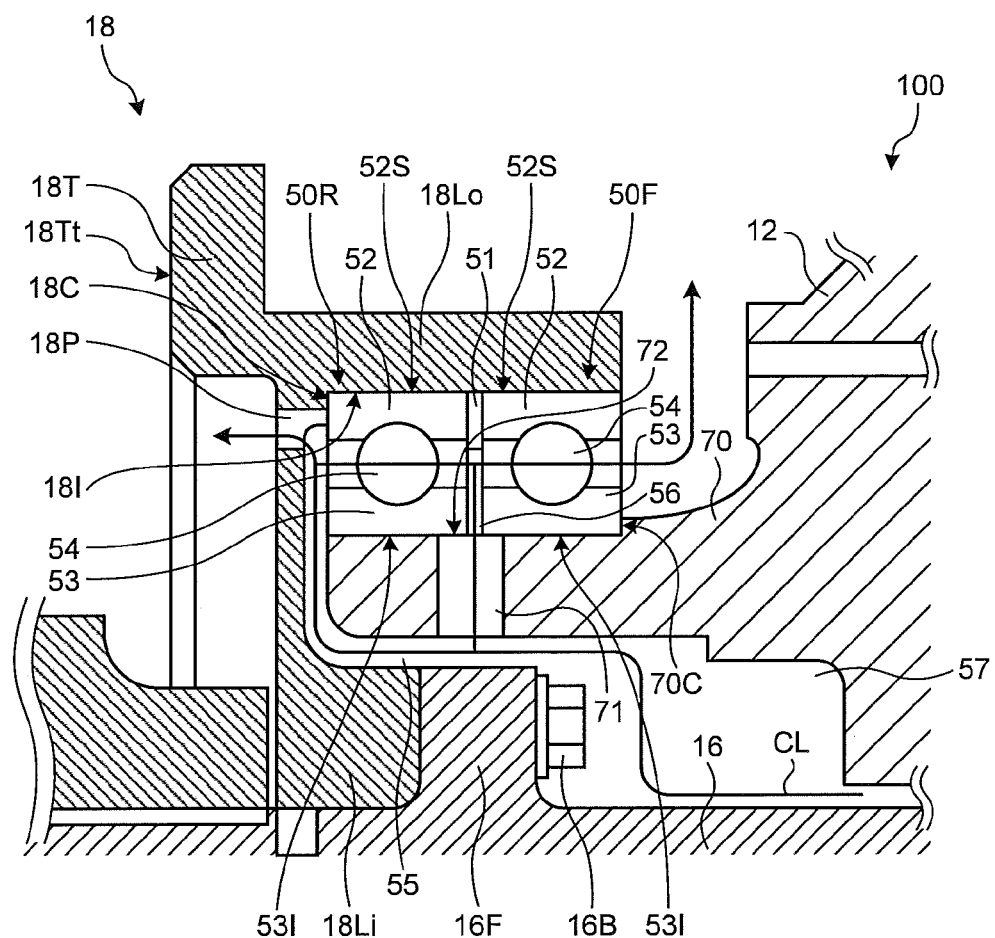
FIG. 11 is a diagram illustrating a cooling structure of the generator motor according to the present embodiment.

FIG. 11 is a diagram illustrating a lubrication structure of a generator motor according to the present embodiment. A lubrication structure 100 of a generator motor according to the present embodiment (hereinafter, referred to as lubrication structure as needed) supplies the coolant CL as a lubricant to at least two bearings that rotatably support the input/output shaft 16 of the generator motor 10 illustrated in FIG. 3, that is, to the first bearing 50F and the second bearing 50R. That is, the above-described coolant CL also functions as a lubricant. The lubrication structure 100 includes a gap (gap between bearings) 56 between the first bearing 50F and the second bearing 50R, the cylindrical-shaped bearing attaching member 70 attached to inner peripheral parts of the first bearing 50F and the second bearing 50R, and the through hole 71 penetrating the bearing attaching member 70 outward in a radial direction and opening in the gap between bearings 56.

As illustrated in FIG. 10, the cylindrical-shaped bearing attaching member 70 extends in the direction parallel with the rotation center axis Zr from one surface 12Ia of the flange 12 (a surface at a side of the first housing 11 and the second housing 13 as the case illustrated in FIG. 3, an inner surface at a side of the case). In the present embodiment, although a plurality of through holes 71 is provided in a circumferential direction of the bearing attaching member 70, the number of the through holes 71 can be at least one. The shape of the cross section of the through hole 71 is a circle, but is not limited to the circle, and may be, for example, an oval, a polygon, and the like. By causing the shape of the cross section of the through hole 71 to be a circle, the through hole 71 can be easily formed in the bearing attaching member 70 by simply perforating the bearing attaching member 70 with a drill or the like. In the present embodiment, the plurality of through holes 71 is provided in the circumferential direction of the bearing attaching member 70 at even intervals, but the through hole 71 may not be provided at even intervals. If the through holes 71 are provided at even intervals, dispersion of supply of the coolant CL in the circumferential directions of the first bearing 50F and the second bearing 50R can be reduced. As a result, deviation of the lubricant of the first bearing 50F and the second bearing 50R can be suppressed and is therefore favorable.

The first bearing 50F and the second bearing 50R are both a deep groove ball bearing, and have an outer ring 52, an inner ring 53, and a rolling element 54 lying between the outer ring 52 and the inner ring 53. Note that the rolling element 54 is a ball. The inner rings 53 of the first bearing 50F and the second bearing 50R rotate around the rotation center axis Zr. In the present embodiment, the number of the bearings that rotatably support the input/output shaft 16 is not limited to two, and may be three or more. The inner rings 53 of the first bearing 50F and the second bearing 50R are attached to an outer peripheral part 72 of the bearing attaching member 70. In this way, the bearing attaching member 70 is attached to the inner peripheral parts of the first bearing 50F and the second bearing 50R, that is, to inner peripheral parts 53I of the inner rings 53. The bearing attaching member 70 has a step part 70C as a first step part at an outer peripheral part, and the first bearing 50F (one of the two bearings) is positioned with respect to the bearing attaching member 70 by being in contact with the step part 70C.

In the rotor holder 18 attached to an outer peripheral part of the input/output shaft 16, the outer rings 52 of the first bearing 50F and the second bearing 50R are attached to an inner peripheral part 18I of the second holder member 18Lo having a cylindrical-shaped structure. In this way, the rotor holder 18 is attached to the outer peripheral parts of the first bearing 50F and the second bearing 50R, that is, to outer peripheral parts 52S of the outer rings 52. The rotor holder 18 has a step part 18C as a second step part at an inner peripheral part, and the second bearing 50R (the other of the two bearings) is positioned with respect to the rotor holder 18 by being in contact with the step part 18C.

The first bearing 50F and the second bearing 50R are disposed with the predetermined gap between bearings 56 in the direction parallel with the rotation center axis Zr. In the present embodiment, the gap between bearings 56 is provided between the first bearing 50F and the second bearing 50R by having the spacer 51 inbetween. The spacer 51 is made of a ring-shaped member. The outer diameter of the spacer 51 is slightly smaller than the inner diameter of the second holder member 18Lo included in the rotor holder 18. The spacer 51 may simply be inserted into the second holder member 18Lo when the first bearing 50F and the second bearing 50R are assembled to the second holder member 18Lo, whereby the work efficiency is improved by using the ring-shaped spacer 51. Note that the shape of the spacer 51 is not limited to the ring shape. Further, at least one of the outer ring 52 of the first bearing 50F and the outer ring 52 of the second bearing 50R may have a protrusion part at an end part perpendicular to the outer peripheral parts 52S. Further, the gap between bearings 56 may be provided by disposing the first bearing 50F and the second bearing 50R such that the protrusion part comes inbetween.

The gap between bearings 56 between the first bearing 50F and the second bearing 50R overlaps with the opening of the through hole 71 at the outer peripheral part 72 of the bearing attaching member 70. That is, the through hole 71 opens in a position that overlaps with the gap between bearings 56. With such a structure, the through hole 71 opens in the position of the gap between bearings 56. As described above, the through hole 71 functions as a passage of the coolant CL and supplies the coolant CL to the gap between bearings 56.

As described above, the rotor holder 18 has the axial-direction through hole 18P penetrating in the direction parallel with the rotation center axis Zr of the input/output shaft 16. To be more specific, the axial-direction through hole 18P penetrates the first holder member 18Li that is a disk-shaped structure lacking the center thereof. A part of the first holder member 18Li faces a side part of the second bearing 50R (a part in the direction parallel with the rotation center axis Zr). In the present embodiment, the axial-direction through hole 18P is provided at a part facing the second bearing 50R. Further, a part of the axial-direction through hole 18P overlaps with a part between the outer ring 52 and the inner ring 53 of the second bearing 50R.

In the present embodiment, although the rotor holder 18 has a plurality of axial-direction through holes 18P, the number of the axial-direction through hole 18P may be at least one. Further, in the present embodiment, the plurality of axial-direction through holes 18P is provided in a circumferential direction of the rotor holder 18, to be more specific, in a circumferential direction of the first holder member 18Li at even intervals. The axial-direction through holes 18P may not be provided at even intervals. However, if the axial-direction through holes 18P are provided at even intervals, the coolant CL flowing out from the second bearing 50R can equally flow out in a circumferential direction of the third holder member 18T included in the rotor holder 18.

The shape of the axial-direction through hole 18P is not especially limited, and the shape may include a circle, an oval, a long hole-shape, a polygon-shape, and the like. When the shape of the axial-direction through hole 18P is a circle, the axial-direction through hole 18P can be relatively easily formed by perforating the rotor holder 18 with a drill or the like.

The coolant CL having passed through the gap between the flange 12 and the input/output shaft 16 flows into a space 57 surrounded by the bearing attaching member 70 and the flange part 16F of the input/output shaft 16. The coolant CL moves outward in a radial direction of the input/output shaft 16 by centrifugal force generated by rotation of the input/output shaft 16, and flows into a gap (shaft outer peripheral gap) 55 between the bearing attaching member 70, and the flange unit 16F and the first holder member 18Li. A part of the coolant CL having flown into the shaft outer peripheral gap 55 passes through the through hole 71, and the rest of the coolant CL moves outward in a radial direction between the bearing attaching member 70 and the first holder member 18Li. The coolant CL having passed through the through hole 71 diverges in both sides in the direction parallel with the rotation center axis Zr, and flows toward the first bearing 50F and the second bearing 50R. Then, the coolant CL passes through a space in the outer rings 52, the inner rings 53, and the rolling elements 54 of the first bearing 50F and the second bearing 50R.

The coolant CL having passed through the first bearing 50F flows into between the flange 12, and the first bearing 50F and the second holder member 18Lo. Further, the coolant CL is discharged outward in a radial direction of the rotor holder 18 by the centrifugal force cause by the rotation of the rotor holder 18, and is then supplied to the coil end of the coil 24C illustrated in FIG. 3, to be more specific, to the coil end at the side of the flange 12 (one coil end), and cools the coil end. The coolant CL having moved between the bearing attaching member 70 and the first holder member 18Li flows out from the axial-direction through hole 18P with the coolant CL having passed through the second bearing 50R. Then, the coolant CL flows into an end face 18Tt of the third holder member 18T by the centrifugal force caused by the rotation of the third holder member 18T, and is discharged outward in a radial direction of the rotor holder 18 from the end face 18Tt. Then, the coolant CL is supplied to the coil end of the coil 24C illustrated in FIG. 3, more specifically, to the coil end at the side of the second housing 13 (the other coil end), and cools the coil end.

When there is no through hole 71, the coolant CL in the space 57 moves outward in a radial direction between the bearing attaching member 70 and the first holder member 18Li. Further, a part of the coolant is supplied to the second bearing 50R, and the rest flows out from the axial-direction through hole 18P. When there is no the through hole 71, the coolant CL having passed through the second bearing 50R flows into the first bearing 50F. Therefore, the first bearing 50F becomes hard to be lubricated or cooled compared with the second bearing 50R. In this way, when there is no through hole 71, dispersion of lubrication and cooling occurs in the first bearing 50F and the second bearing 50R. As a result, the first bearing 50F that is hard to be lubricated and cooled is more likely to become worn compared with the second bearing 50R. Further, the amount of the coolant passing through the first bearing 50F and flowing into the side of the flange 12 is smaller than that of the coolant flowing into the side of the second housing 13. Therefore, coolability of the coil end at the side of the flange 12 is likely to be lowered than that of the coil end at the side of the second housing 13. As a result, the coil end at the side of the flange 12 and the coil end at the side of the second housing 13 may bring about the possibility of dispersion of cooling condition.

In the lubrication structure 100, the coolant CL having passed from the space 57 to the shaft outer peripheral gap 55 passes through the through hole 71, diverges in two directions at an outlet of the through hole 71, and is supplied to both of the first bearing 50F and the second bearing 50R. Therefore, with a structure having the through hole 71, dispersion of the coolant CL supplied to the first bearing 50F and the second bearing 50R can be reduced. As a result, the lubrication structure 100 is capable of reducing the dispersion of the lubrication condition of the first bearing 50F and the second bearing 50R (same applies to cooling of the bearings) when the first bearing 50F and the second bearing 50R of the generator motor 10 are lubricated. As a result of suppression of the dispersion of lubrication and cooling of the first bearing 50F and the second bearing 50R, worn condition of the first bearing 50F and the second bearing 50R becomes similar. Therefore, the lubrication structure 100 is capable of reducing concentration of a load caused by the dispersion of worn condition between the two bearings, and is capable of stably driving the generator motor 10.

The flow rate of the coolant passing through the axial-direction through hole 18P can be adjusted by adjusting the cross-section area of the axial-direction through hole 18P included in the rotor holder 18 (area of a cross section perpendicular to the direction to which the axial-direction through hole 18P penetrates). Therefore, the balance between the flow rate of the coolant flowing in the first bearing 50F and the flow rate of the coolant flowing in the second bearing 50R can be adjusted by adjusting the flow rate of the coolant passing through the axial-direction through hole 18P.

Further, the lubrication structure 100 causes the coolant CL to diverge in two directions at an outlet of the through hole 71, and supplies the coolant to both of the first bearing 50F and the second bearing 50R. Since the first bearing 50F and the second bearing 50R have the same specification, the flow rates of the coolant CL that passes through respective bearings become nearly equal. Therefore, the amount of the coolant CL flowing out from the first bearing 50F to the side of the flange 12 and the amount of the coolant CL flowing out from the second bearing 50R to the side of the second housing 13 become nearly equal. As a result, in the lubrication structure 100, the amount of the coolant CL supplied at the side of the flange 12 via the first bearing 50F and the amount of the coolant CL supplied at the side of the second housing 13 via the second bearing 50R become nearly equal, whereby the dispersion of cooling condition of the coil end at the side of the flange 12 and the coil end at the side of the second housing 13 can be reduced.

When the generator motor 10 is initiated under the condition that the outdoor temperature is low, the generator motor 10 is driven under the condition that the temperature of the coolant CL is low and the viscosity of the coolant LC is high. In this case, the coolant CL is supplied to the first bearing 50F and the second bearing 50R through the narrow shaft outer peripheral gap 55 formed between the bearing attaching member 70, and the flange unit 16F and the first holder member 18Li. When the temperature of the coolant CL is low and the viscosity thereof is high, the resistance of the coolant CL passing through the shaft outer peripheral gap 55 becomes high, and therefore, the coolant CL becomes hard to flow in to the shaft outer peripheral gap 55. As a result, when there is no through hole 71, a sufficient amount of the coolant CL is not supplied to the first bearing 50F and the second bearing 50R, and this may bring about the possibility of insufficient lubrication. Since the lubrication structure 100 communicates the shaft outer peripheral gap 55 and the gap between bearings 56 by the through hole 71, the coolant CL in the shaft outer peripheral gap 55 flows into the gap between bearings 56 through the through hole 71 and is supplied to both of the first bearing 50F and the second bearing 50R. In this way, the lubrication structure 100 is capable of supplying the sufficient coolant CL to the first bearing 50F and the second bearing 50R through the through hole 71, thereby suppressing the lack of the lubricant and the dispersion of the lubrication condition of the first bearing 50F and the second bearing 50R even if the viscosity of the coolant CL is high and the sufficient coolant CL is hard to be supplied to one of the bearings. Especially, many construction sites where a construction machine is used may often be in a harsh environment such as extreme cold, severe heat, and therefore, the above-described structure has a big advantage.

As the generator motor 10 is driven and the temperature of the coolant CL increases, the temperature of the coolant CL becomes higher and the viscosity thereof becomes lower. In this case, if there is no through hole 71, after passing through the shaft outer peripheral gap 55, the coolant CL is deviated outward in a radial direction of the rotor 20 by the centrifugal force of the rotor 20. Under this condition, the first bearing 50F and the second bearing 50R at a side of the outer rings 52 are lubricated and cooled, but the first bearing 50F and the second bearing 50R at a side of the inner rings 53 are likely to lack lubrication and cooling. Since the shaft outer peripheral gap 55 and the gap between bearings 56 are communicated by the through hole 71, the coolant CL in the shaft outer peripheral gap 55 flows into the gap between bearings 56 from the first bearing 50F and the second bearing 50R at the side of the inner ring 53 through the through hole 71 even if the viscosity of the coolant CL is lowered. Therefore, the coolant is supplied at the side of the outer ring 52 by the centrifugal force while the sufficient coolant CL is supplied to the first bearing 50F and the second bearing 50R at the side of the inner ring 53. In this way, the lubrication structure 100 supplies the coolant CL to the first bearing 50F and the second bearing 50R through the through hole 71, thereby suppressing the lack of lubrication and the dispersion of lubrication condition of the first bearing 50F and the second bearing 50R even if the viscosity of the coolant CL is low and the coolant CL is deviated outward in a radial direction by the centrifugal force. Especially, many construction sites where a construction machine is used may often be in a harsh environment such as extreme cold, severe heat, and therefore, the above-described structure has a big advantage.

The through hole 71 and the gap between bearings 56 included in the bearing attaching member 70 have function to cause the coolant CL to pass through and to hold the coolant CL. Therefore, even if the supply of the coolant CL to the shaft outer peripheral gap 55 is temporarily stopped due to any cause, the coolant CL held in the through hole 71 and the gap between bearings 56 lubricates and cools the first bearing 50F and the second bearing 50R. In this way, the lubrication structure 100 is capable of lubricating and cooling the first bearing 50F and the second bearing 50R, thereby suppressing the deterioration of durability of the first bearing 50F and the second bearing 50R even if the supply of the coolant CL is temporarily stopped.

In the present embodiment, the generator motor 10 has also a function to transfer the power of the internal-combustion engine 6 to the hydraulic pump 7. Therefore, the generator motor 10 is disposed between the internal-combustion engine 6 and the hydraulic pump 7. In such a disposition, it is favorable to minimize the size in the direction parallel with the rotation center axis Zr, so that the internal-combustion engine 6, the generator motor 10, and the hydraulic pump 7 become easier to be loaded on a vehicle. Therefore, the generator motor 10 allows the first bearing 50F and the second bearing 50R to rotatably support a central part of the input/output shaft 16 instead of both end parts thereof. In this structure, a large load is applied to the first bearing 50F and the second bearing 50R when a radial load acts on an end part of the input/output shaft 16 and a moment works, which causes the input/output shaft 16 to rotate around the first bearing 50F and the second bearing 50R, for example. In this case, the load applied to the first bearing 50F and the second bearing 50R becomes larger in proportion to the distance between the end part of the input/output shaft 16, and the first bearing 50F and the second bearing 50R. Therefore, if the first bearing 50F and the second bearing 50R are not sufficiently lubricated and cooled, this may bring about the possibility of deterioration of durability of the first bearing 50F and the second bearing 50R.

As described above, the lubrication structure 100 supplies the coolant to the first bearing 50F and the second bearing 50R from an inner periphery side of the first bearing 50F and the second bearing 50R through the through hole 71. Therefore, the lubrication structure 100 is capable of suppressing the deviation of the coolant, and evenly supplying the coolant to the first bearing 50F and the second bearing 50R. The first bearing 50F and the second bearing 50R can be sufficiently lubricated and cooled, and the deterioration of the durability can be suppressed even under the structure where the central part of the input/output shaft 16 is rotatably supported by the first bearing 50F and the second bearing 50R. As described above, the lubrication structure 100 is favorably applicable to a device disposed between the power source and the target to be driven of the power source, and having a function to transfer the power of the power source to the target to be driven such as the generator motor 10.

As described above, the present embodiment provides a gap between at least two bearings that rotatably support an input/output shaft of a generator motor as well as a through hole opening in a position that overlaps with a gap of a cylindrical-shaped bearing attaching member attached to inner peripheral parts of the two bearings. With such a structure, after passing through the through hole, the coolant diverges in two directions and is supplied to both of the bearings, whereby dispersion of the coolant supplied to both of the bearings can be reduced. As a result, the present embodiment is capable of reducing the dispersion of lubrication condition and cooling condition of each bearing when a plurality of bearings included in the generator motor is lubricated.

REFERENCE SIGNS LIST

1 Hybrid excavator
2 Lower traveling body

3 Upper swinging body
6 Internal-combustion engine
6S Output shaft
7 Hydraulic pump
7S Input shaft
10 Generator motor
11 First housing
12 Flange
13 Second housing
14 Flywheel
15 Coupling member
16 Input/output shaft
17 Rotor core
18 Rotor holder
18Li First holder member
18Lo Second holder member
18T Third holder member
20 Rotor
24 Stator
24C Coil
24I Insulator
24K Stator core
32 First passage
32i Inner first passage
32o Outer first passage
32H First passage outlet
33 Second passage
33H Second passage outlet
33I Second passage inlet
40F First blade
40R Second blade
50F First bearing
50R Second bearing
51 Spacer
52 Outer ring
53 Inner ring
54 Rolling element
55 Shaft outer peripheral gap (gap)
56 Gap between bearings (gap)
57 Space
60 Protrusion part
70 Bearing attaching member
71 Through hole
80 Rib
100 Lubrication structure (lubrication structure of a generator motor)
Zr Rotation center axis

The invention claimed is:

1. A lubrication structure of a generator motor, comprising:
   at least two bearings rotatably supporting an input/output shaft of the generator motor;
   a gap provided between the two bearings;
   a cylindrical-shaped bearing attaching member attached to inner peripheral parts of the two bearings; and
   a through hole penetrating the bearing attaching member outward in a radial direction and opening in a position overlapping with the gap.

2. The lubrication structure of a generator motor according to claim 1, further comprising
   a rotor core holding member attached to an outer peripheral part of the input/output shaft and to outer peripheral parts of the two bearings and holding a rotor core of the generator motor,
   wherein the rotor core holding member has an axial-direction through hole penetrating in a direction parallel with a rotation center axis of the input/output shaft.

3. The lubrication structure of a generator motor according to claim 1, wherein a spacer lies between the two bearings.

4. The lubrication structure of a generator motor according to claim 1,
   wherein the bearing attaching member has a first step part at an outer peripheral part, the first step part being in contact with one of the two bearings, and
   a rotor core holding member holding a rotor core of the generator motor has a second step part at an inner peripheral part, the second step part being in contact with the other of the two bearings.

5. The lubrication structure of a generator motor according to claim 2,
   wherein after a coolant passes through the through hole, flows into the gap, and passes through the two bearings,
   one part of the coolant is supplied to one coil end of a stator included in the generator motor, and
   the other part of the coolant is supplied to the other coil end of the stator after passing through the axial-direction through hole.

6. A generator motor comprising a lubrication structure, comprising:
   at least two bearings rotatably supporting an input/output shaft of the generator motor;
   a gap provided between the two bearings;
   a cylindrical-shaped bearing attaching member attached to inner peripheral parts of the two bearings; and
   a through hole penetrating the bearing attaching member outward in a radial direction and opening in a position overlapping with the gap.

7. The generator motor according to claim 6, wherein in the generator motor, an output shaft of a power source is connected to one end of the input/output shaft, and an input shaft of a target to be driven by power of the power source is connected to the other end of the input/output shaft.

8. A generator motor provided between an internal-combustion engine and a hydraulic pump, transferring power of the internal-combustion engine to the hydraulic pump, and generating electric power, comprising:
   at least two bearings rotatably supporting an input/output shaft of the generator motor;
   a gap provided between the two bearings;
   a cylindrical-shaped bearing attaching member disposed at an outer peripheral part of the input/output shaft and attached to inner peripheral parts of the two bearings;
   a through hole penetrating the bearing attaching member outward in a radial direction and opening in a position of the gap;
   a rotor core holding member attached to the outer peripheral part of the input/output shaft and to outer peripheral parts of the two bearings and holding a rotor core of the generator motor;
   an axial-direction through hole penetrating the rotor core holding member in a direction parallel with a rotation center axis of the input/output shaft; and
   a spacer lying between the two bearings.

9. The lubrication structure of a generator motor according to claim 2,
   wherein a coolant passes through the through hole, flows into the gap, is separated into and passes through the two bearings, and is supplied to both coil ends of a stator included in the generator motor.

* * * * *